United States Patent
Wild et al.

[11] Patent Number: 6,068,574
[45] Date of Patent: May 30, 2000

[54] METHOD AND ARRANGEMENT FOR CONTROLLING AN OUTPUT TORQUE OF A DRIVE TRAIN OF A VEHICLE

[75] Inventors: Ernst Wild, Oberriexingen; Manfred Hellmann, Hardthof; Andrea Steiger-Pischke, Weissach; Dirk Samuelsen, Asperg; Wolfgang Hermsen, Rodgau, all of Germany

[73] Assignee: Robert Bosch GmbH, Stuttgart, Germany

[21] Appl. No.: 08/959,490

[22] Filed: Oct. 28, 1997

[30] Foreign Application Priority Data

Oct. 29, 1996 [DE] Germany ............................. 19644881

[51] Int. Cl.$^7$ .................................................. B60K 41/10
[52] U.S. Cl. ............................................................. 477/110
[58] Field of Search ....................................... 477/110, 107

[56] References Cited

U.S. PATENT DOCUMENTS

| | | | |
|---|---|---|---|
| 5,021,958 | 6/1991 | Tokoro | 477/110 |
| 5,343,781 | 9/1994 | Minowa et al. | 477/107 |
| 5,377,110 | 12/1994 | Ikeura | 477/107 |
| 5,484,351 | 1/1996 | Zhang et al. | 477/110 |
| 5,496,227 | 3/1996 | Minowa et al. | 477/110 |
| 5,681,238 | 10/1997 | Minowa et al. | 477/107 |
| 5,746,679 | 5/1998 | Minowa et al. | 477/107 |

FOREIGN PATENT DOCUMENTS

WO 92-09448 6/1992 WIPO.

*Primary Examiner*—Dirk Wright
*Attorney, Agent, or Firm*—Walter Ottesen

[57] ABSTRACT

The invention is directed to a method and an arrangement for controlling an output torque of a drive train of a motor vehicle. A desired value for the output torque is made available by the adjustment of a transmission and by the control of the engine. The desired value is determined on the basis of a driver command signal as well as on the basis of a minimum and/or maximum output torque dependent upon operating variables.

14 Claims, 3 Drawing Sheets

METHOD AND ARRANGEMENT FOR CONTROLLING AN OUTPUT TORQUE OF A DRIVE TRAIN OF A VEHICLE

FIELD OF THE INVENTION

The invention relates to a method and an arrangement for controlling the output torque of a drive train of a motor vehicle wherein a desired value for the output torque is formed in dependence upon the driver command. The drive unit of the vehicle is so controlled that the output torque of the drive train corresponds to this desired value.

BACKGROUND OF THE INVENTION

A method and an arrangement of the above kind are described in international patent publication WO/A 92-09448. There, an output torque desired value is determined in dependence upon the position of an operator-controlled element (accelerator pedal) and, if required, while taking into account the output rpm of the drive train (output rpm of the transmission, wheel rpm). The gear ratio of the transmission is determined in dependence upon this output torque desired value. Then, the torque of the drive unit of the drive train is adjusted in such a manner that the actual value of the output torque assumes the magnitude of the desired value. This adjustment is made while taking into account the transmission ratio.

In the known procedure, lost motion in the position of the accelerator pedal can occur when computing the desired value from the position of the accelerator pedal. This lost motion can occur, for example, because of switching in consumers or because of changing elevation above sea level.

SUMMARY OF THE INVENTION

It is an object of the invention to provide measures with the aid of which the accelerator pedal position can be assigned a drive torque or a wheel torque without lost motion occurring.

The method of the invention is for controlling an output torque of a drive train of a vehicle and includes the steps of: forming a desired value for the output torque in dependence upon a command of the driver of the vehicle and by taking into account at least one of a minimum output torque dependent upon operating variables and a maximum output torque dependent upon operating variables; and, controlling the drive unit so that the output torque of the drive train corresponds to the desired value.

With the solution provided by the invention, the determination of the desired values for the output torque or wheel torque at the output of the drive train of a vehicle is considerably improved. These desired values are dependent upon the position of the accelerator pedal. It is especially advantageous that the lost motion in the pedal is cancelled.

It is especially advantageous that the driver does not perceive or sense the adaptations (necessary according to the invention) as a consequence of the corresponding filtering. The adaptation of the allocation of the output torque to the accelerator pedal position is filtered in such a manner that the adaptation remains below the perception threshold of the driver.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
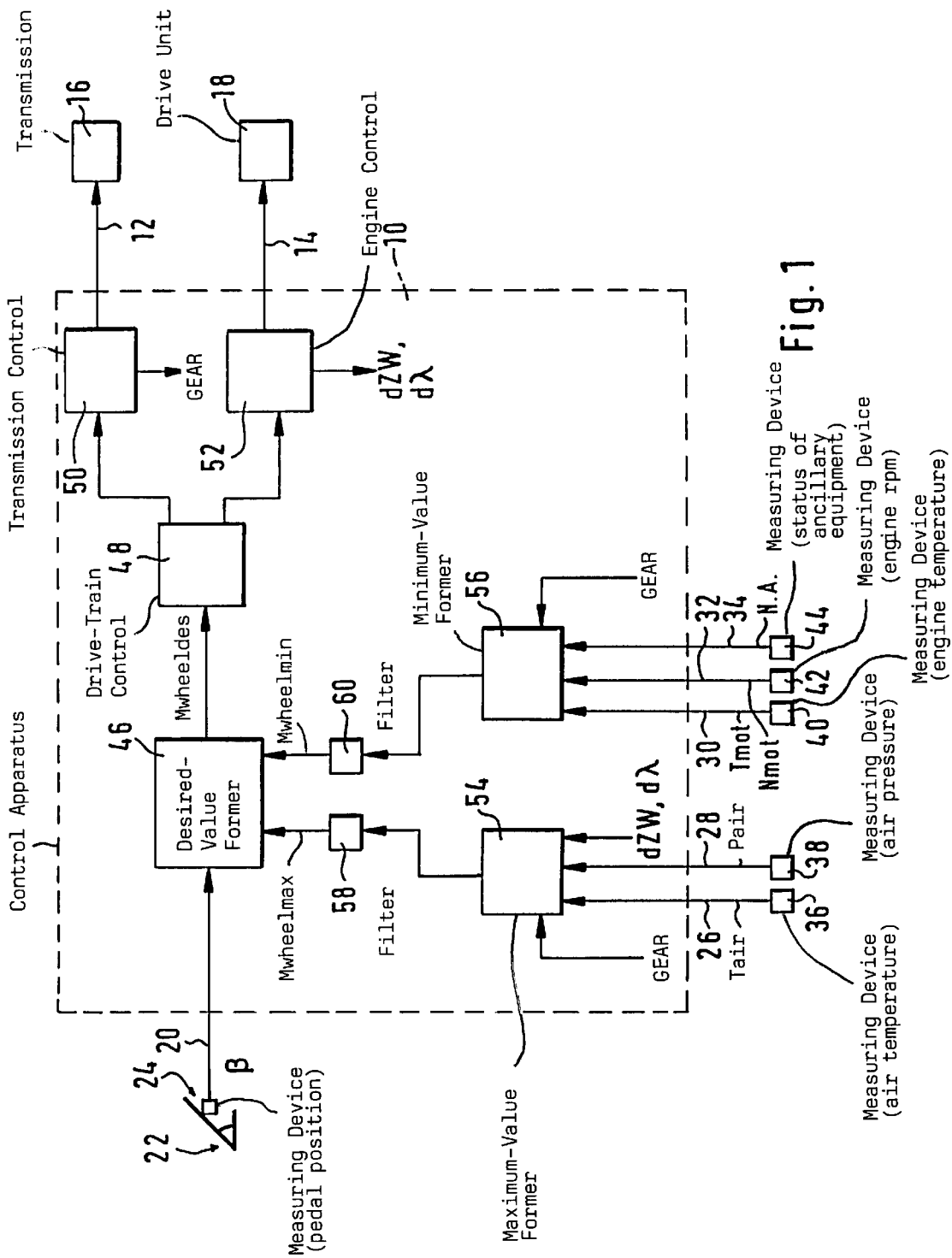
FIG. 1 is an overview block circuit diagram of a control apparatus for controlling the transmission and the drive unit according to an embodiment of the invention.

FIG. 1 shows a control apparatus 10 which controls a transmission 16 and a drive unit 18 of the vehicle via output lines 12 and 14. The measuring device 24 is connected to an operator-controlled element such as an accelerator pedal 22 which can be actuated by the driver. The control apparatus 10 receives, via an input line 20, a measure for the position $\beta$ of the accelerator pedal from the measuring device 24. The control apparatus 10 receives measurement quantities via input lines 26, 28, 30, 32 and 34 from an air-temperature measuring device 36, an air pressure measuring device 38, an engine temperature measuring device 40, an engine rpm measuring device 42 and a measuring device 44. The measuring device 44 transmits the status of ancillary equipment (switched on/switched off). Furthermore, the variables which are necessary in connection with the control of the engine and the transmission, are also supplied but are not shown for reasons of clarity. These variables include vehicle road speed, air mass, et cetera.

The control apparatus 10 includes at least one microcomputer which is programmed for carrying out the various functions. The blocks shown in FIG. 1 define individual programs or program steps of the microcomputer.

From the input line 20, a desired-value former 46 receives value of the accelerator pedal position signal $\beta$ as well as values which represent the maximum attainable wheel torque Mwheelmax (maximum wheel torque) as well as the minimum wheel torque Mwheelmin (brake torque, maximum motor brake). From these input quantities, a desired wheel torque Mwheeldes is computed by the desired-value former 46, for example, via conventional interpolation methods. This desired wheel torque Mwheeldes is supplied to the drive-train control 48.

The drive-train control 48 forms the transmission ratio, which is to be adjusted, or the transmission torque amplification (torque amplification MAB/MMot) or the force torque amplification (FAn/MMot) as well as an engine torque to be adjusted. The drive-train control 48 forms the above from the supplied desired value and, if required, while also considering additional operating variables known per se. These desired quantities are supplied to the transmission control 50 and to the engine control 52. The controls 50 and 52 influence the transmission and the engine in correspondence to their desired inputs.

It is problematic with respect to the computation of the wheel torque desired value from the degree of actuation of the accelerator pedal (while considering the maximum and minimum torques), that idle motion can occur in the path of the accelerator pedal because of changes in the minimum and/or maximum torques. Accordingly, it can happen that the minimum torque when adjusting the accelerator pedal zero position or the maximum torque for a fully actuated accelerator pedal cannot be adjusted. In these cases, the idle motion occurs at the start or toward the end of the position path of the accelerator pedal. Such a situation can occur, for example, when the vehicle is at high elevation. Then the maximum power of the engine (the charge of the engine) and therefore the maximum torque becomes less. The maximum pregiven torque cannot be achieved in this case. A similar situation applies for the minimum torque which is, for example, dependent upon the engine temperature and the switching in and switching out of ancillary equipment. If a fixed pregiven minimum wheel torque cannot be achieved, then here too idle motion occurs in the position path of the accelerator pedal. According to the invention, the actual possible maximum and minimum torques are continuously computed and are assigned to respective position values of the accelerator pedal. In this way, no idle motion occurs. The continuous adaptation of the accelerator path to the actual possible torques does not take place in a jump-like manner. Accordingly, there is no suddenly changing wheel torque requirement for the same pedal position. The adaptation is therefore filtered as a function of time according to the invention so that the adaptation remains below the perception threshold of the driver.

For the above reason, the actual maximum and/or minimum wheel torque is continuously computed (54, 56). The maximum wheel torque is primarily dependent upon the air density which influences the air/fuel mixture supplied to the engine and therefore the power capacity thereof. Accordingly, the maximum-value former 54 is supplied with the air temperature Tair and/or the air pressure Pair. The maximum torque is proportional to the density so that, with increasing air density, the maximum torque increases. The maximum torque therefore increases with decreasing temperature and increasing air pressure. Furthermore, it must be considered that the maximum possible wheel torque is dependent upon gear ratio. A different maximum wheel torque is pregiven depending upon the adjusted transmission gear ratio and converter state for automatic transmissions having a converter. The actual set gear ratio GEAR, converter amplification or transmission torque amplification is supplied by the transmission control 50 to the maximum-value former 54. Furthermore, deviations in the ignition angle setting and/or lambda setting must be considered for a fully actuated accelerator pedal. If these settings deviate from the setting with optimal torque, then a corresponding efficiency dZW of the ignition angle or of the air/fuel ratio dλ is to be considered. The corresponding values are formed in the engine control and supplied to the maximum-value former 54. The efficiency defines a percent reduction of the base value for the maximum wheel torque. The base value is determined experimentally for torque-optimal conditions. The maximum wheel torque is determined in the maximum-value former 54 in accordance with pregiven characteristic lines, tables or computation steps. This wheel torque is filtered in the filter element 58. This filter element 58 is, in the preferred embodiment, an integrator or a lowpass filter. The filter time is selected to be adequately long so that changes in the maximum value of the wheel torque remain below the perception threshold of the driver. A suitable filter time lies in the region of minutes (for example, 1 minute).

The same as above corresponds to the computation of the minimum wheel torque which takes place in the minimum-value former 56. Here, especially the variables transmission gear ratio GEAR, converter amplification or torque amplification, engine temperature Tmot, engine rpm Nmot and/or the status of ancillary equipment NA (such as a climate control system) are considered. The minimum torque increases for a cold engine, with increasing rpm, when ancillary apparatus is switched in; that is, a higher engine brake torque is achieved. The minimum wheel torque Mwheelmin is formed in the minimum-value former 56 based on experimentally determined characteristic lines, tables or computation steps. The minimum wheel torque Mwheelmin is filtered in filter 60 in correspondence to the maximum wheel torque and is supplied to the desired-value former 46.

In the desired-value former 46, the desired wheel torque Mwheeldes is determined on the basis of the maximum and/or minimum wheel torques as well as on the basis of the accelerator pedal position value in the context of conventional interpolation (for example, linear interpolation). The accelerator pedal position signal utilized is normalized in the preferred embodiment; that is, its lowest value corresponds to 0% and its highest value corresponds to 100%. When the accelerator pedal is released (zero position) and the vehicle is at standstill, the minimum wheel torque is zero so that zero is pregiven as the desired wheel torque. The engine is then controlled by the engine control 52 in the context of an idle control.

The maximum and/or minimum torques are determined experimentally under pregiven conditions. To adapt these torques, the above-described variables are selected in dependence upon the extent of their influence. In one preferred embodiment, all above-mentioned variables are evaluated and, in another embodiment, only selected variables are evaluated. In addition to the above-mentioned variables, additional variables are considered in some embodiments. Thus, for the determination of the minimum torque, the road speed (increase of the minimum torque with road speed) is considered and for the determination of the maximum torque, the inclination of the roadway is considered, et cetera.

Figure 2:
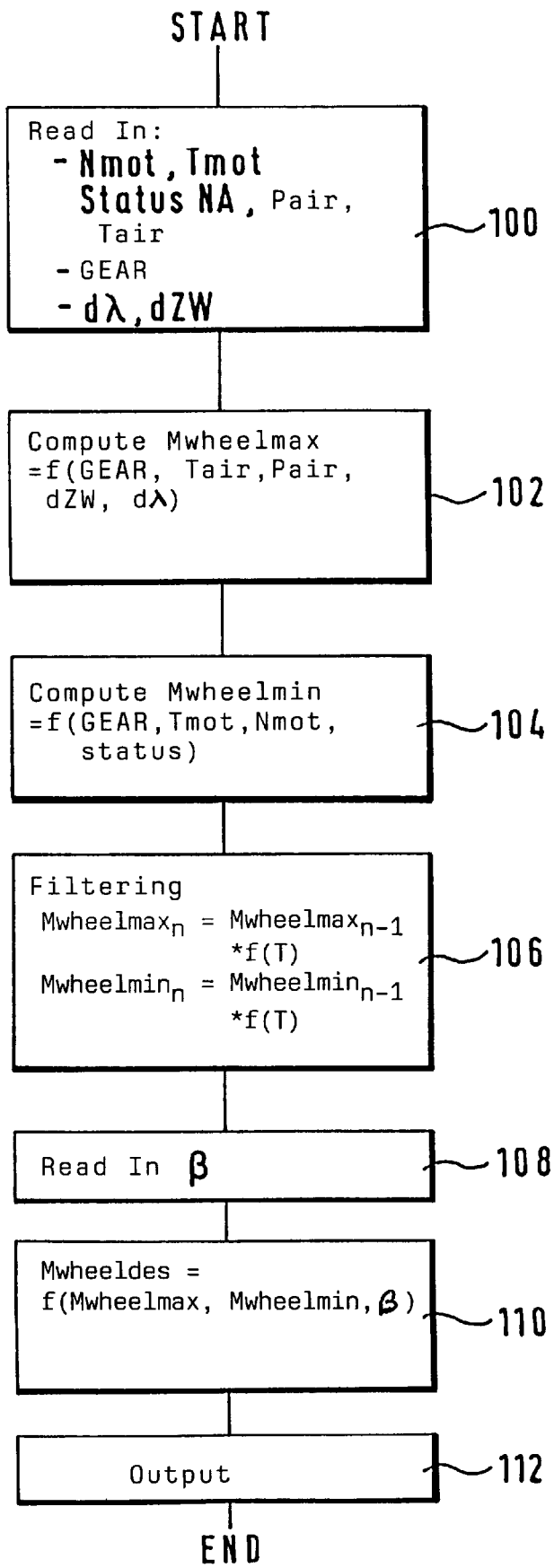
FIG. 2 is a flowchart showing the method of the invention realized as a computer program; and, FIG. 3 shows, by way of example, a characteristic line of the assignment of the accelerator pedal position to the desired torque.

In FIG. 2, a flowchart is shown which defines a preferred realization of the method of the invention as a computer program.

The subprogram shown in FIG. 2 is started at pregiven time points, for example, every ten to 100 milliseconds.

In the first step 100, the following operating variables are read in: engine rpm Nmot, engine temperature Tmot, status of ancillary equipment (NA), air pressure Pair, air temperature Tair, the data GEAR as to the setting of the transmission gear ratio, the converter amplification and/or torque amplification as well as, if required, the efficiency dZW of the ignition angle and the efficiency dλ of the air/fuel ratio adjustment. The data GEAR is transmitted from the transmission control 50 and the efficiency of the ignition angle and the air/fuel ratio adjustment is determined by the engine control 52.

In the next step 102, the maximum wheel torque Mwheelmax is computed. For this purpose, the following are considered: the transmission gear ratio, the air temperature, the air pressure, the ignition angle efficiency and the lambda efficiency. The maximum wheel torque is then less in magnitude the lower the gear; that is, the higher the transmission gear ratio is, the warmer the air, the lower the air pressure and the lower the efficiency of the ignition angle and lambda (that is, the further away these adjustments are from the optimal torque value).

Correspondingly, in the next step 104, the minimum wheel torque Mwheelmin is computed. Here, the transmission gear ratio, engine temperature, engine rpm and the status of the ancillary consumers are considered. As a rule, the minimum wheel torque changes in the direction of a higher brake torque (that is, it becomes greater in magnitude) the lower the set gear is (that is, the greater the gear ratio), the colder the engine is, the greater engine rpm and with an ancillary apparatus switched in.

In the next step 106, the maximum and minimum wheel torques are filtered. The filter constant is such that changes in the variables lie below the perception threshold of the driver. In the preferred embodiment, the value of the maximum and/or minimum wheel torques (Mwheelmax(n), Mwheelmin(n)) is determined from the corresponding values of a previous program runthrough (Mwheelmax(n-1), Mwheelmin(n-1)) with weighting with a pregiven filter function or time function.

In the next step 108, the normalized accelerator pedal position value β is read in. Thereafter, in step 110, the wheel torque desired value Mwheeldes is computed on the basis of the accelerator pedal position value β as well as the maximum and minimum wheel torque values, for example, in the context of linear interpolation. After step 110, the wheel torque desired value computed in this manner is outputted to the drive-train control 48 in step 112.

Figure 3:
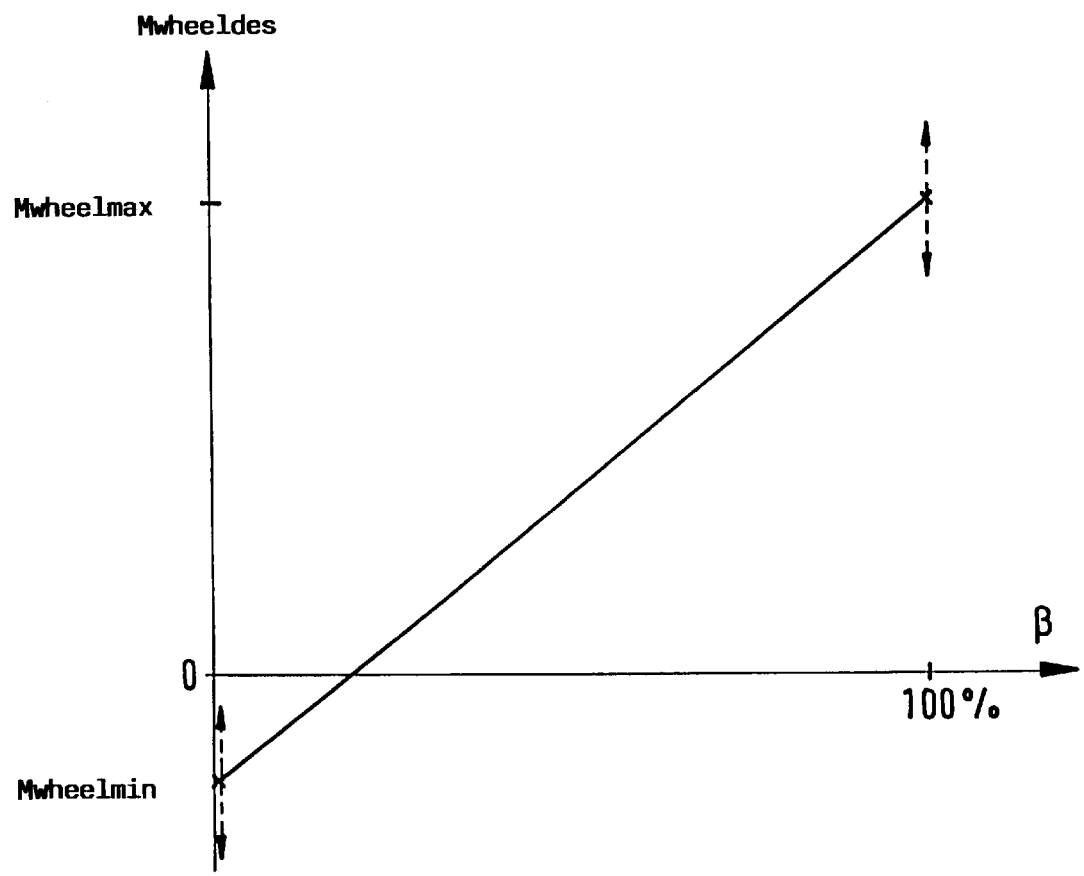

In FIG. 3, the relationship between the accelerator pedal position and the desired wheel torque is plotted. The accelerator pedal position value is changeable between 0% (released pedal) and 100% (fully actuated pedal). The wheel torque desired value changes between the changeable minimum and the changeable maximum values. The minimum wheel torque value (engine braking torque) is assigned to the accelerator pedal position 0% and the maximum wheel torque value is assigned to the accelerator pedal position 100%. A characteristic line is drawn between these values utilizing interpolation. On the basis of this characteristic line, the particular wheel torque desired value for a detected accelerator pedal position value is determined while considering the changeable minimum and maximum wheel torque desired values.

In another embodiment, one of the limit values is pregiven as a fixed value and the other limit value is provided to change in the manner described above.

Under the term "wheel torque", also the output torque or the transmission output torque can be understood depending upon the location where the torque or the drive force is detected. These variables are equivalent in the context of the solution provided by the invention and generally define an output torque of the drive train.

In another embodiment, the relationship between the accelerator pedal position and the desired torque is not a linear characteristic line; instead, the relationship is a characteristic line which changes progressively or degressively with the accelerator pedal position. This characteristic line is further dependent, as required, on operating variables such as the transmission gear ratio, road speed, et cetera. In this case, the limit values are determined as mentioned above and support locations lying therebetween are adapted to the change of the limit values and, if required, on the basis of a weighting of the limit values.

It is understood that the foregoing description is that of the preferred embodiments of the invention and that various changes and modifications may be made thereto without departing from the spirit and scope of the invention as defined in the appended claims.

What is claimed is:

1. An arrangement for controlling an output torque of a drive train of a vehicle having a drive unit in the form of a motor, the arrangement comprising:

means for detecting a command (β) of a driver of said vehicle;

means for detecting one or more operating variables including at least one of motor temperature, motor rpm, ancillary consumers, transmission ratio, converter amplification and vehicle speed; and, an electronic control unit for controlling said drive unit of said vehicle, the electronic control unit including:

means for determining a minimum torque (Mwheelmin) in dependence upon at least one of said operating variables; and, means for determining a desired value (Mwheeldes) for the output torque of said drive train in dependence upon at least said command (β) of said driver of said vehicle and said minimum torque (Mwheelmin).

2. A method of controlling an output torque of a drive train of a vehicle having a drive unit in the form of a motor, the method comprising the steps of:

detecting a command (β) of a driver of said vehicle;

detecting one or more operating variables including at least one of motor temperature, motor rpm, ancillary consumers, transmission ratio, converter amplification and vehicle speed;

determining a minimum torque (Mwheelmin) in dependence upon at least one of said operating variables;

forming a desired value (Mwheeldes) for the output torque of said drive train at least in dependence upon said command (β) and said minimum torque Mwheelmin); and, controlling said drive unit in dependence upon said desired value.

3. The method of claim 2, wherein a minimum torque (Mwheelmin) is assigned to a zero command of said driver and a maximum torque (Mwheelmax) is assigned to a full-load command of said driver.

4. The method of claim 3, wherein said motor is an internal combustion engine having an ignition angle setting having an efficiency and a lambda setting having an efficiency said maximum torque (Mwheelmax) is dependent upon at least one of the following: a set value of said transmission ratio, torque amplification, air temperature, air pressure, the efficiency of the ignition angle setting and the efficiency of the lambda setting.

5. The method of claim 4, wherein said engine operates at an engine temperature and the minimum torque (Mwheelmin) is formed in dependence upon the engine temperature, the engine rpm, the status of ancillary apparatus as well as the transmission ratio and the torque amplification.

6. The method of claim 5, wherein at least one of the minimum torque (Mwheelmin) and the maximum torque is filtered.

7. The method of claim 6, wherein said at least one of said minimum and maximum torques is so filtered that changes remain below a perception threshold of the driver.

8. The method of claim 7, wherein said at least one of said minimum and maximum torques are adapted continuously to actual attainable values of said torques during operation of said drive train.

9. The method of claim 7, wherein the filters are integrators of lowpass filters.

10. A method of controlling an output torque of a drive train of a vehicle operated by a driver, said drive unit being an internal combustion engine operating at an engine temperature and having an ignition angle setting having an efficiency and a lambda setting having an efficiency, the method comprising the steps of:

forming a desired value for said output torque in dependence upon a command of the driver of said vehicle and by taking into account at least one of a minimum output torque dependent upon operating variables and a maximum output torque dependent upon operating variables;

controlling said drive unit so that the output torque of said drive train corresponds to said desired value;

assigning a minimum torque (Mwheelmin) to a zero command of said driver and a maximum torque (Mwheelmax) to a full-load command of said driver;

wherein said maximum torque (Mwheelmax) is dependent upon at least one of the following: a set value of said transmission ratio, torque amplification, air temperature, air pressure, the efficiency of the ignition angle setting and the efficiency of the lambda setting; and, forming the minimum torque (Mwheelmin) in dependence upon the engine temperature, the engine rpm, the status of ancillary apparatus as well as the transmission ratio and the torque amplification.

11. The method of claim 10, wherein at least one of the minimum torque (Mwheelmin) and the maximum torque is filtered.

12. The method of claim 11, wherein said at least one of said minimum and maximum torques is so filtered that changes remain below a perception threshold of the driver.

13. The method of claim 12, wherein said at least one of said minimum and maximum torques are adapted continuously to actual attainable values of said torques during operation of said drive train.

14. The method of claim 12, wherein the filters are integrators or lowpass filters.

* * * * *

UNITED STATES PATENT AND TRADEMARK OFFICE
CERTIFICATE OF CORRECTION

PATENT NO. : 6,068,574
DATED : May 30, 2000
INVENTOR(S) : Ernst Wild, Manfred Hellmann, Andrea Steiger-Pischke, Dirk Samuelsen and Wolfgang Hermsen It is certified that error appears in the above-identified patent and that said Letters Patent is hereby corrected as shown below:

<u>Column 6,</u>
Line 20, delete "Mwheelmin)" and substitute -- (Mwheelmin) -- therefor.
Line 31, between "efficiency" and "said", insert a comma.
Line 56, between "said" and "drive", insert -- vehicle having a --.
Line 56, delete "being" and substitute -- which is -- therefor.

Signed and Sealed this

Sixth Day of November, 2001

*Attest:*

NICHOLAS P. GODICI
*Attesting Officer*     *Acting Director of the United States Patent and Trademark Office*